United States Patent
Alderighi et al.

(10) Patent No.: US 11,966,666 B2
(45) Date of Patent: Apr. 23, 2024

(54) METHOD FOR COMPUTATIONALLY DESIGNING RE-USABLE FLEXIBLE MOLDS FOR THE REPRODUCTION OF AN OBJECT

(71) Applicant: Institute of Science and Technology Austria, Klosterneuburg (AT)

(72) Inventors: Thomas Alderighi, Prato (IT); Paolo Cignoni, Piombino (IT); Luigi Malomo, Pisa (IT); Daniela Giorgi, Pisa (IT); Bernd Bickel, Klosterneuburg (AT); Nico Pietroni, Sydney (AU)

(73) Assignee: INSTITUTE OF SCIENCE AND TECHNOLOGY AUSTRIA, Klosterneuburg (AT)

( * ) Notice: Subject to any disclaimer, the term of this patent is extended or adjusted under 35 U.S.C. 154(b) by 427 days.

(21) Appl. No.: 17/262,119

(22) PCT Filed: Jul. 12, 2019

(86) PCT No.: PCT/AT2019/060232
§ 371 (c)(1),
(2) Date: Jan. 21, 2021

(87) PCT Pub. No.: WO2020/019008
PCT Pub. Date: Jan. 30, 2020

(65) Prior Publication Data
US 2021/0294928 A1    Sep. 23, 2021

(30) Foreign Application Priority Data

Jul. 24, 2018    (AT) .............................. 601072/2018

(51) Int. Cl.
*G06F 30/20*     (2020.01)
*B29C 33/38*     (2006.01)
(Continued)

(52) U.S. Cl.
CPC .......... *G06F 30/10* (2020.01); *B29C 33/3835* (2013.01); *B33Y 50/00* (2014.12);
(Continued)

(58) Field of Classification Search
CPC ...... G06F 30/10; G06F 30/20; G06F 2111/22; G06F 2113/10; B33Y 80/00; B33Y 50/00; B29C 33/3835
(Continued)

(56) References Cited

U.S. PATENT DOCUMENTS

| 6,619,943 B1* | 9/2003 | Sameshima ......... B29C 44/0469 |
| | | 425/185 |
| 2011/0189440 A1* | 8/2011 | Appleby ................... B22C 9/10 |
| | | 523/435 |

FOREIGN PATENT DOCUMENTS

WO    2011/044903    4/2011

OTHER PUBLICATIONS

Malomo et al. (FlexMolds: Automatic Design of Flexible Shells for Molding, (12 pages)). (Year: 2016).*

(Continued)

*Primary Examiner* — Andre Pierre Louis
(74) *Attorney, Agent, or Firm* — SAND, SEBOLT & WERNOW CO., LPA (57) ABSTRACT

The invention relates to a method for computationally designing re-usable silicone molds for the reproduction of an object, wherein the silicone mold is fillable with casting material, for example, but not limited to, resin, to form the object.

20 Claims, 5 Drawing Sheets

(51) Int. Cl.
  *B33Y 50/00*    (2015.01)
  *B33Y 80/00*    (2015.01)
  *G06F 30/10*    (2020.01)
  *G06F 113/10*   (2020.01)
  *G06F 113/22*   (2020.01)

(52) U.S. Cl.
  CPC .............. *B33Y 80/00* (2014.12); *G06F 30/20* (2020.01); *G06F 2113/10* (2020.01); *G06F 2113/22* (2020.01)

(58) Field of Classification Search
  USPC .......................................................... 703/1
  See application file for complete search history.

(56) References Cited

OTHER PUBLICATIONS

Luigi Malomo et al: "FlexMolds", ACM Transactions on Graphics, ACM, 2 Penn Plaza, Suite 701, New York, NY, 10121-0701, USA, vol. 35, No. 6, Nov. 11, 2016, pp. 1-12, XP058306361, ISSN: 0730-0301, DOI: 10.1145/2980179,2982397 Section 4—Section 5 figures 1, 4, 10, 21.

Priyadarshi A K et al: "Geometric algorithms for automated design of multi-piece permanent molds", Computer Aided Design, Elsevier Publishers BV., Barking, GB vol. 36, No. 3, Mar. 1, 2004, pp. 241-260, XP004476517, ISSN: 0010-4485, DOI: 10.106/S0010-4485(03)00107-6 Section 3.1.

* cited by examiner

METHOD FOR COMPUTATIONALLY DESIGNING RE-USABLE FLEXIBLE MOLDS FOR THE REPRODUCTION OF AN OBJECT

FIELD OF THE INVENTION AND DESCRIPTION OF PRIOR ART

The invention relates to a method for computationally designing at least one re-usable flexible mold for the reproduction of an object, wherein the flexible mold is at least two-pieced and fillable with casting material, for example, but not limited to, resin, to form the object to be reproduced within the mold, wherein the mold consists of flexible material, like for example, but not limited to silicone, for the reproduction of an object.

Moreover, the present invention relates to a re-usable flexible mold designed based on a method according to the invention. Also, the present invention relates to a method for reproduction of an object by using a mold designed in accordance to the present invention. The re-usable mold can be made of any flexible material sufficient to form a mold that is flexible and sufficient for casting an object within a hollow space enclosed within the mold, for instance materials like silicone, alginate etc.

Also, the present invention relates to an object reproduced by a method according to the present invention.

Document EP 3 301 597 A1 describes a method for computationally designing re-usable flexible molds. Therein, an algorithm is described that allows to calculate the strain upon removal of the flexible mold, wherein the mold is openable along a parting line (also referred to as cut layout), wherein calculation and determination of an optimized parting line in view of the strain limitations of the object to be casted and the flexible mold-material takes place by applying an optimization algorithm.

SUMMARY OF THE INVENTION

The invention relates to a method for computationally designing at least one re-usable flexible mold for the reproduction of an object, wherein the flexible mold is at least two-pieced and fillable with casting material, for example, but not limited to, resin, to form the object to be reproduced within the mold, wherein the mold consists of flexible material, comprising the following steps:
a) taking as an initial input a digital surface description of the object to be reproduced, said input comprising a closed surface mesh of the object to be reproduced, said initial closed surface mesh being aligned with the surface of the object to be reproduced,
b) calculating an at least two-pieced flexible mold by executing the following steps
b1) separating the mesh into a number of connected surface patches, wherein each surface patch is associated with an patch-individual parting direction and is selected either
b1_1) based on an heuristic estimation of the effort for removal of each patch from the flexible mold and wherein the design and number of patches is selected based on an minimization algorithm (see paper "Metamolds: Computational Design of Silicone Molds"), or
b1_2) based on a volume based calculation model (see paper "Volume-Aware Design of Composite Molds"), wherein a fictive volume enclosing the object to be reproduced is determined and wherein shortest paths from the surface of the mesh to the outer boundary of the volume are determined for each point of the surface mesh, thus yielding potential extraction directions that are associated along the surface of the mesh, wherein the potential extraction directions are compared along the surface of mesh and wherein the patches are determined based on detected discontinuity of the potential extraction directions,
b2) calculating the at least two-pieced flexible mold based on the surfaces patches yielded in step b1), wherein the number of pieces of the mold corresponds with the number of patches,
c) calculating the process of production of the at least two-pieced flexible mold, wherein the calculation comprises a selection of either
c_1) calculating a corresponding rigid metamold for casting the flexible mold yielded in step b), or
c_2) calculating a process for additively manufacturing, in particular 3D printing, the flexible mold,
d) yielding the design of the at least two-pieced flexible mold of step b) and the result of the calculation of the process of production according to of step c) as an output.

The number of pieces of the silicone molds which together form a flexible mold for casting a final object is variable and depends on the shape of the object. For instance, the number can vary between 2 and 30, in particular 2, 3, 4, 5 . . . etc. The invention also includes an algorithm to optimize the number and shape of the silicone molds and correspondingly the metamolds (for more details see document "Metamolds: Computational Design of Silicone Molds"). In many cases a layout having two silicone mold pieces are preferable, wherein the two mold pieces were connectable to another and sealed by protrusions and corresponding openings and/or sealing lips. Separate silicone mold pieces are designed to be connected to each other in order to enclose a hollow space, said hollow space corresponding to the shape of the object to be cast and thus being configured to be filled with casting material. For this purpose, the silicone molds may comprise a number of air vents and at least one opening in order to fill the closed silicone mold hollow space with casting material. Moreover, the flexible mold can also be part of a composite mold, i.e. a mold that consists of an inner, flexible layer (usually silicone), and an outer, rigid layer. The outer layer can have the benefit that the mold will deform less when filled, and the flexible part can be thinner, which makes it easier to remove the mold.

The flexible mold is designed to allow non-destructive removal from the object. I.e. the term "non-destructive casting" means that neither the mold nor the object is destroyed during the casting procedure.

Exemplary explanation of heuristic mentioned in b1_1: The heuristic estimation is a practical method for quantifying how much effort is required to remove the mold from the object at a given surface location along a given parting direction. The removal effort can be assumed to be zero for faces on the objects surface that are visible from the outside along the parting direction. For a given parting direction, we assume that surface portions sufficiently close to visible areas can be extracted even if they are not directly visible, thanks to the flexibility of the mold. The removal effort for a non-visible surface location depends on its distance on the objects surface from visible areas. A detailed description of how this heuristic can be computed can be found in the paper "Metamolds: Computational Design of Silicone Molds" in Section 4.2. A detailed description of how this heuristic can be used to compute connected surface patches corresponding to mold pieces can be found in the paper "Metamolds: Computational Design of Silicone Molds" in Section 4.1.

Exemplary explanation of volume-based calculation model mentioned in b1_2: The volume-based calculation model starts in a first step by identifying at least two parting directions and the corresponding parting surface. This can be done by testing candidate parting directions which are obtained by uniformly sampling directions on a sphere. As parting directions, directions are chosen which minimize the non-visible surface area of the object from these directions. This yields a partitioning of the objects surface. Then, a fictive volume enclosing the object is determined, and shortest paths between boundary of the objects surface patches and the outer surface of the fictive volume are computed. This induces a partition of the fictive volume, where each part would correspond to a flexible mold piece. A detailed description of how this could be implemented can be found in the paper "Volume-Aware Design of Composite Molds" in Section 4.1.

Once the volume of the flexible mold has been partitioned into at least two pieces, for each piece additional cuts corresponding to features that could prevent the mold extraction can be determined. For this, shortest paths from each point of the object's surface mesh to the outer boundary of the fictive volume are computed. These shortest paths are not allowed to intersect the object itself. A cut is introduced when the escape paths of two adjacent surface locations traverse the volume on significantly different paths. The rationale is that a mold piece can be extracted if all of its points can reach the boundary along similar paths. Otherwise, an additional cut is needed. A detailed description of a potential implementation can be found in the paper "Volume-Aware Design of Composite Molds", Section 4.

Preferably, the at least two-pieced flexible mold can comprise a sealing dam or a sealing lip for closing the two-pieced mold. Sealing dams can be added as a plug and slot structure surrounding the object in a closed loop over the parting surface to secure the sealing between different mold pieces. The purpose of a sealing dam or sealing lip is to prevent the leakage of casting material during the casting process (see also paper "Metamolds: Computational Design of Silicone Molds", Section 5.2).

Advantageously, an optimal orientation of the at least two-pieced flexible mold with regard to earths gravitational field can be calculated according to an optimization algorithm. An orientation is considered optimal if it minimizes the formation or trapping of air bubbles in the cavity of the silicone mold. In the paper "Volume-Aware Design of Composite Molds", Section 5.2, a strategy to identify regions is described, wherein air bubbles can get trapped and the amount of trapped air while pouring liquid (see also FIG. 12 in the paper) for a given mold orientation. Using this criterion, the amount of trapped air for a large number different orientations (for example sampled uniformly over the hemisphere) is evaluated then and the orientation of the mold that trapped the smallest amount of air and air bubbles can be selected.

Preferably, the optimization algorithm can also be configured to determine optimal positioning of air vents within the mold and/or of inlets for pouring in the casting material. The origin of air vents can be placed at locations where air bubbles might get trapped otherwise, to let air escape during casting.

Advantageously, the calculation of step c1 can determine if at least one membrane is to be included in the rigid metamold in order to insert a corresponding cut into the flexible mold, such that the non-destructive removal of the cured object is possible from the flexible mold, and if so, also to determine the shape of the membrane. A detailed description can be found in paper "Metamolds: Computational Design of Silicone Molds" Section 4.5.

Preferably, the calculation of step c2 can determine if at least one cut is required in the flexible mold, such that the non-destructive removal of the mold from the cured object is possible, and if so, also to determine the shape of the cut.

Advantageously, the calculation of membranes or cuts can be computed by detecting tunnels loops in the digital surface description (see paper "Metamolds: Computational Design of Silicone Molds" Section 4.5). By alternative, the calculation of the membranes or cuts can be computed by detecting discontinuities in the direction of the of the shortest paths throughout the volume around the digital surface description (see paper "Volume-Aware Design of Composite Molds" Sections 4.2 to 4.4).

Preferably, the calculation of each surface patch according to step b1) can be associated with a patch-individual parting direction and is selected according to step b1_1) of claim 1, wherein the mesh consists of faces, wherein the visibility of a face is evaluated from a number of different viewpoints determined by potential parting directions, wherein neighbouring faces having at least one similar potential parting direction are grouped into a potential patch, splitting the mesh into a number of potential patches, and wherein an optimal set of patches is determined by the following criterions: {minimizing number of patches within a set, while ensuring that the entirety of the patches cover the entire mesh; minimizing the effort of removal of the patches within a set}. Each face can also be referred to for instance as surface of a triangle, wherein the mesh consists of triangles and therefore can be represented by a set of points marking the corners of the edges, see also for instance FIG. 3 of the paper "Metamolds: Computational Design of Silicone Molds" (for instance 650 parting direction candidate). The goal could be formulated as follows: Each face has to have exactly one parting direction, while minimizing the absolute number of parting directions, while faces having identical parting directions are connected to each other, while minimizing the effort for removal (also referred in the paper as "costs")). The solution to this problem is an optimized patch layout, wherein each patch consists o set of neighbouring faces having similar parting direction.

Advantageously, the object or a corresponding cavity and the at least two-pieced mold can be separated by at least one parting line, wherein the parting line is defined as at least one closed curve in 3D space that is shaped when the two pieces of the mold and the cavity or the object within the mold meet one another, wherein the parting line is a curve that does not lie entirely within a single plane.

The invention also relates to a method for reproduction of an object by using a mold designed in accordance to any of the preceding claims, comprising the steps of
  e) filing the mold with casting material, and
  f) non-destructive removal of the cured object from the mold.

Preferably, the mold is produced by 3D-printing.

Alternatively, the mold is produced by casting a flexible curable material, for instance silicone, into a corresponding metamold.

Furthermore, the present invention also relates to a reusable flexible mold and an object reproduced by a method according the present invention.

Preferably, the metamold according to step d) can be produced through 3D-printing.

Moreover, it is possible that the surface description according step a) comprises a representation of a closed surface mesh of the object, said initial closed surface mesh being aligned with surface of the object to be reproduced, said initial closed mesh being partitioned into a set comprising a plurality of initial patches, whose boundaries provide a feasible initial cut layout. The cut layout can also correspond with the boundaries between mold pieces.

More generally, the invention can also relate to a method for computationally designing re-usable flexible molds for the reproduction of an object, wherein the silicone mold is fillable with casting material, for example resin, to form the object, comprising the following steps:
- a) taking as an initial input a digital surface description of the object to be reproduced,
- b) calculating a re-usable flexible mold model based on the input of step a), said model allowing non-destructive casting of the objects and removal of the flexible mold,
- c) calculating corresponding solid molds for casting the flexible molds derived from the model of step b), said corresponding molds being referred to as metamolds,
- d) producing the metamolds,
- e) filling said metamolds with liquid curable material, for instance liquid silicone, curing the material into a solidified yet flexible material, for instance cured silicone, and yielding corresponding flexible molds. Moreover, it is possible that the surface description according step a) comprises a representation of a closed surface mesh of the object, said initial closed surface mesh being aligned with surface of the object to be reproduced, said initial closed mesh being partitioned into a set comprising a plurality of initial patches, whose boundaries provide a feasible initial cut layout. The cut layout can also correspond with the boundaries between mold pieces.

Further embodiments and details are disclosed in the attached documents "Metamolds: Computational Design of Silicone Molds" and "Volume-Aware Design of Composite Molds".

BRIEF DESCRIPTION OF THE DRAWINGS

In the following, in order to further demonstrate the present invention, illustrative and non-restrictive embodiments are discussed, as shown in the drawings, which show:

FIG. 1 a schematic diagram showing the relevant steps of the method according to the invention, FIGS. 2 and 3 views of a mythical creature as an example for an object to be reproduced, FIG. 4 a digital representation of the creature according to FIGS. 2 and 3, FIG. 5 an exemplary split of the mesh of FIG. 4 into two patches, FIGS. 6 and 7 exemplary metamolds, FIGS. 8 and 9 exemplary re-usable flexible molds, and FIG. 10 a perspective view of a cup as an example for an object to be reproduced.

DETAILED DESCRIPTION OF EMBODIMENTS OF THE INVENTION

In the following, identical reference signs used in the figures depict identical features if not stated otherwise. Reference is also made to the drawings and description disclosed in the attached documents "Metamolds: Computational Design of Silicone Molds", and "Volume-Aware Design of Composite Molds", said documents being hereby incorporated by reference.

Figure 1:
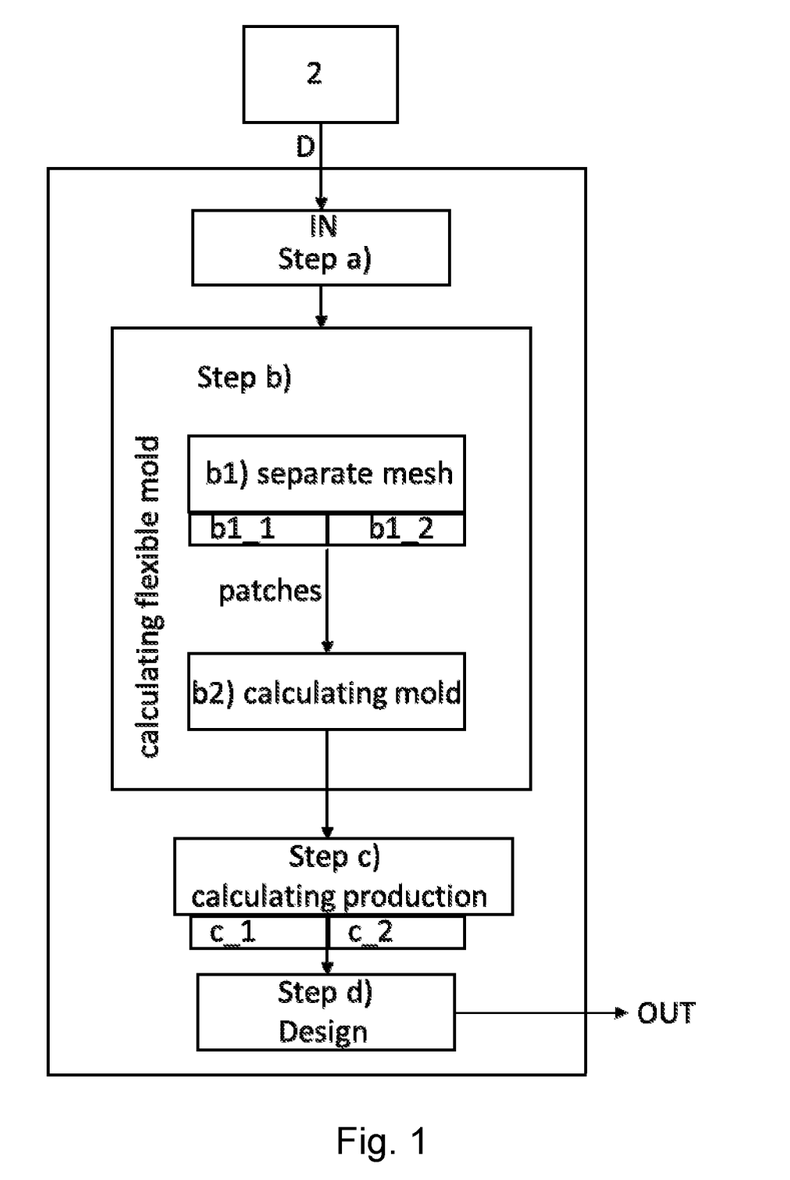

FIG. 1 shows schematic diagram showing the relevant steps of the method according to the invention.

Figure 2:
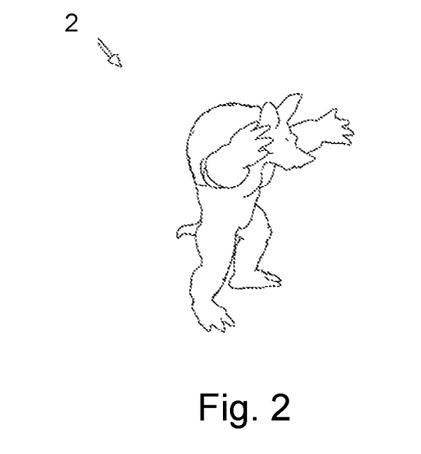
Figure 3:
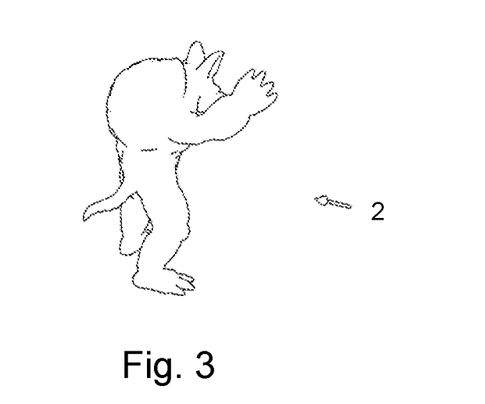

FIG. 2 shows perspective view of a mythical creature as an example for an object 2 to be reproduced. FIG. 3 shows yet another view of the creature of FIG. 2.

Figure 4:
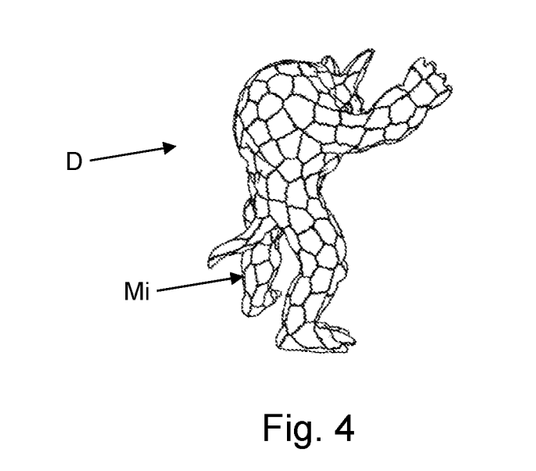
Figure 5:
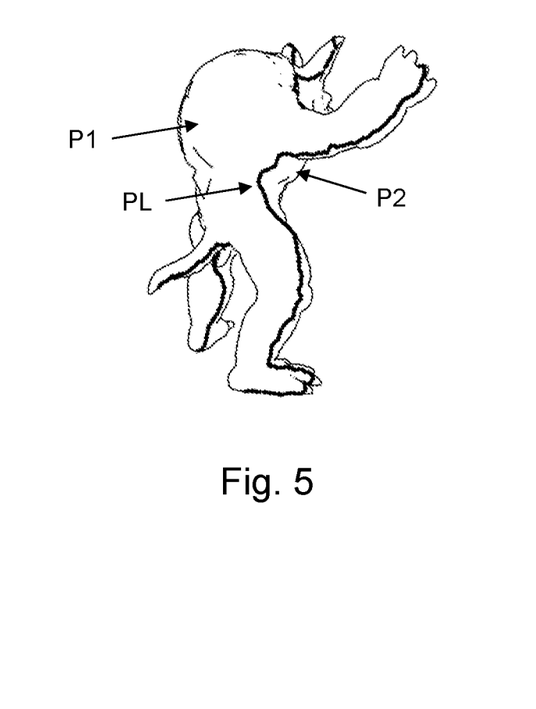

FIG. 4 shows a digital surface description D, in particular a digital representation, of the creature according to FIGS. 2 and 3. Therein, the representation comprises an initial mesh Mi, that is—based on an algorithm according to the invention, rearranged into a minimized number of patches, wherein in the following example the algorithm is able to reduce the number of patches down to two, namely P1 and P2 (see FIG. 5). Consequently, the flexible mold resulting from this calculation will have two pieces, namely one piece corresponding to P1 and one piece corresponding to P2. The line referenced as "PL" shown in FIG. 5 represents the parting line between the patches P1 and P2 and the respective pieces of the mold.

The invention discloses two different algorithms two calculate these patches, namely either
- b1_1) based on an heuristic estimation of the effort for removal of each patch from the flexible mold and wherein the design and number of patches is selected based on an minimization algorithm (see paper "Metamolds: Computational Design of Silicone Molds"), or
- b1_2) based on a volume based calculation model, wherein a fictive volume enclosing the object to be reproduced is determined and wherein shortest paths from the surface of the mesh to the outer boundary of the volume are determined for each point of the surface mesh, thus yielding potential extraction directions that are associated along the surface of the mesh, wherein the potential extraction directions are compared along the surface of mesh and wherein the patches are determined based on detected discontinuity of the potential extraction directions (see paper "Volume-Aware Design of Composite Molds").

Figure 6:
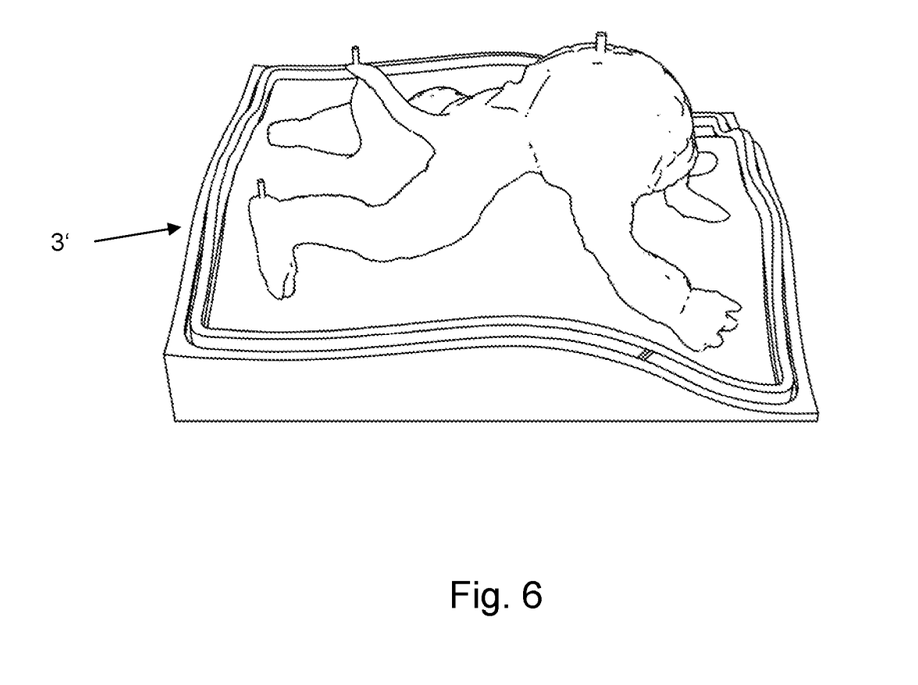
Figure 7:
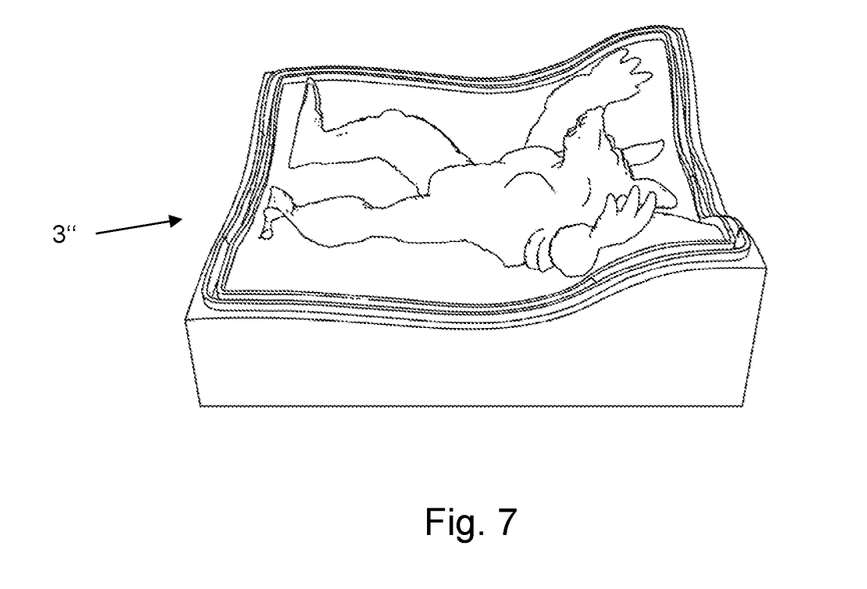
Figure 8:
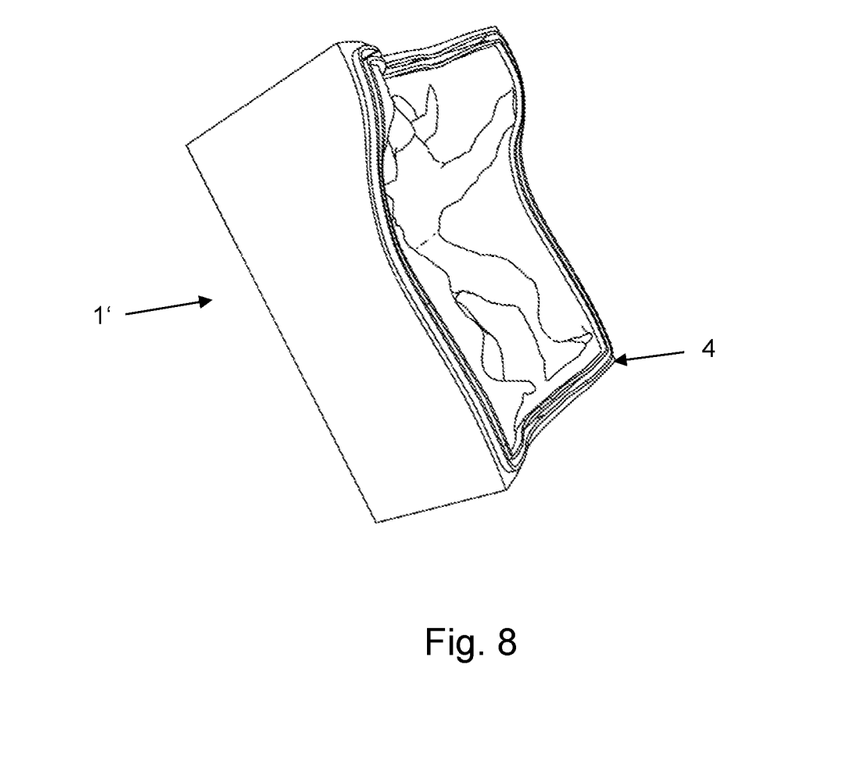
Figure 9:
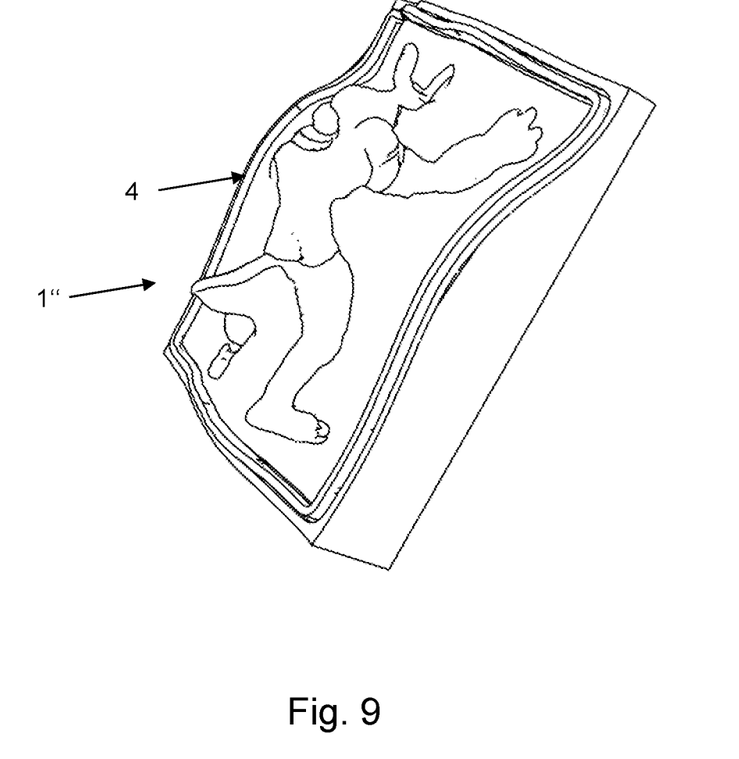

FIGS. 6 and 7 show exemplary metamolds 3' and 3", i.e. molds calculated and produced in order to manufacture the corresponding flexible molds 1' and 1" (see FIGS. 8 and 9). In detail, the flexible molds 1' and 1" are casted by covering the rigid metamolds 3' and 3" with the elastic material, or with a coverage that is filled with liquified elastic material, that can be cured later on like silicone. By alternative, the flexible molds 1' and 1" could also be manufactured by 3D-printing or another suitable method. Currently, 3D-printers printing silicone are under development and already commercially available.

In other words, the present invention relates to a method for computationally designing at least one re-usable flexible mold 1' and 1" for the reproduction of an object 2, wherein the flexible mold 1', 1" is at least two-pieced and fillable with casting material, for example, but not limited to, resin, to form the object 2 to be reproduced within the mold 1, wherein the mold 1 consists of flexible material, comprising the following steps:
- a) taking as an initial input IN a digital surface description D of the object 2 to be reproduced, said input IN comprising a closed surface mesh Mi of the object 2 to be reproduced, said initial closed surface mesh Mi being aligned with surface of the object 2 to be reproduced,
- b) calculating an at least two-pieced flexible mold 1', 1" by executing the following steps b1) separating the mesh Mi into a number of connected surface patches P1, P2, wherein each surface patch P1, P2 is associated with an patch-individual parting direction and is selected either
b1_1) based on an heuristic estimation of the effort for removal of each patch P1, P2 from the flexible mold 1', 1" and wherein the design and number of patches P1, P2 is selected based on an minimization algorithm, or
b1_2) based on a volume based calculation model, wherein a fictive volume enclosing the object to be reproduced is determined and wherein shortest paths from the surface of the mesh Mi to the outer boundary of the volume (see for instance section 4.1 of the paper "Volume-Aware Design of Composite Molds") are determined for each point of the surface mesh Mi, thus yielding potential extraction directions that are associated along the surface of the mesh Mi, wherein the potential extraction directions are compared along the surface of mesh Mi and wherein the patches are determined based on detected discontinuity of the potential extraction directions,
b2) calculating the at least two-pieced flexible mold 1', 1" based on the surfaces patches P1, P2 yielded in step b1), wherein the number of pieces of the mold 1', 1" corresponds, namely equals, with the number of patches P1, P2,
c) calculating the process of production of the at least two-pieced flexible mold 1', 1", wherein the calculation comprises a selection of either
c_1) calculating a corresponding rigid metamold 3', 3" for casting the flexible mold 1', 1" yielded in step b), or
c_2) calculating a process for additively manufacturing, in particular 3D printing, the flexible mold 1', 1",
d) yielding the design of the at least two-pieced flexible mold 1', 1" of step b) and the result of the calculation of the process of production according to of step c) as an output OUT.

As can be seen FIGS. 8 and 9 the flexible mold 1', 1" comprises a sealing dam 4 for closing the two-pieced mold.

Figure 10:
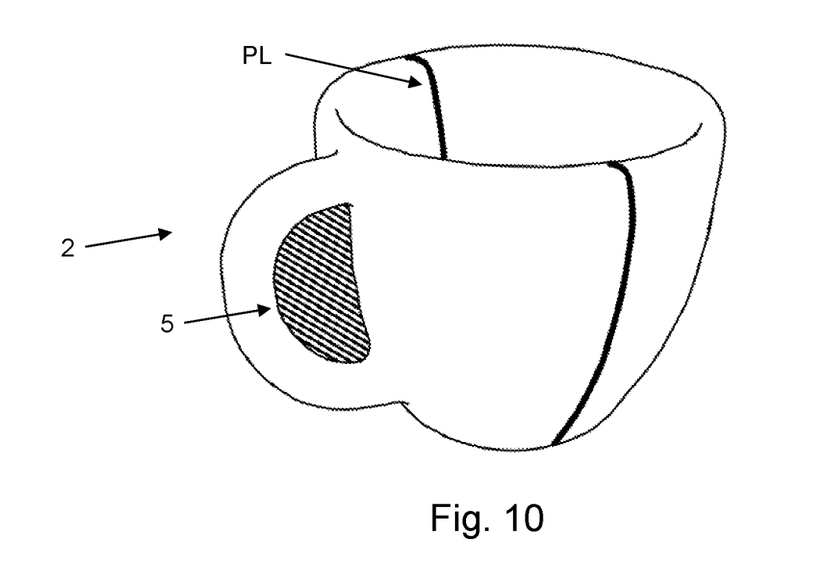

FIG. 10 shows a perspective view of a cup as an example for an object 2 to be reproduced. The line references as "PL" shows the parting line between the respective two pieces of an exemplary mold for reproducing this object. Furthermore, one additional cut location is shown, which can be realized as a membrane 5 that is included in the rigid metamold in order to insert a corresponding cut into the flexible mold, such that the non-destructive removal of the cured object is possible from the flexible mold.

Exemplary drawings showing the process of reproducing an object by filling flexible molds with casting material can also be seen in FIG. 9 of the paper "Volume-Aware Design of Composite Molds", which are explained correspondingly in said paper.

The invention claimed is:

1. A method for reproducing an object, said method comprising steps of:
designing at least one re-usable two-pieced flexible mold for the reproduction of the object, wherein designing comprises the following steps:
a) taking as an initial input (IN) a digital surface description (D) of the object to be reproduced, said input (IN) comprising a closed surface mesh (Mi) of the object to be reproduced, said initial closed surface mesh (Mi) being aligned with a surface of the object to be reproduced;
b) calculating the flexible mold by executing the following steps:
b1) separating the mesh into a number of connected surface patches (P1, P2), wherein each surface patch (P1, P2) is associated with a patch-individual parting direction and is selected either:
b1_1) based on an heuristic estimation of the effort for removal of each patch (P1, P2) from the flexible mold and wherein a design and number of patches (P1, P2) is selected based on a minimization algorithm; or
b1_2) based on a volume based calculation model, wherein a fictive volume enclosing the object to be reproduced is determined and wherein shortest paths from the surface of the mesh (Mi) to an outer boundary of the volume are determined for each point of the surface mesh (Mi), thus yielding potential extraction directions that are associated along the surface of the mesh (Mi), wherein the potential extraction directions are compared along the surface of mesh (Mi) and wherein the patches (P1, P2) are determined based on detected discontinuity of the potential extraction directions;
b2) calculating the flexible mold based on the surfaces patches (P1, P2) yielded in step b1), wherein the number of pieces of the flexible mold corresponds with the number of patches (P1, P2);
c) calculating a process of production of the flexible mold, wherein the calculation comprises a selection of either:
c_1) calculating a corresponding rigid metamold for casting the flexible mold yielded in step b); wherein the calculation of step c_1) determines if at least one membrane is to be included in the corresponding rigid metamold in order to insert a corresponding cut into the flexible mold, such that non-destructive removal of a cured object is possible from the flexible mold, and if so, also to determine a shape of the at least one membrane; or
c_2) calculating a process for additively manufacturing the flexible mold; and
d) yielding a design of the flexible mold of step b) and a result of the calculation of the process of production according to step c) as an output (OUT);
producing the two-pieced flexible mold utilizing the design yielded as the output (OUT) in step (d);
filling a cavity defined by the two-pieced flexible mold with a flexible casting material; and
forming the object from the flexible casting material within the filled cavity of the flexible mold.

2. The method according to claim 1, further comprising forming the flexible mold to include a sealing dam or a sealing lip for closing the flexible mold.

3. The method according to claim 1, wherein during designing of the flexible mold, an optimal orientation of the flexible mold with regard to Earth's gravitational field is calculated according to an optimization algorithm (OA).

4. The method according to claim 3, wherein the optimization algorithm (OA) is also configured to determine an optimal positioning of air vents within the flexible mold or of inlets for pouring in the flexible casting material.

5. The method according to claim 1, wherein calculation of step c_2) determines if at least one cut is required in the flexible mold, such that non-destructive removal of the flexible mold from the cured object is possible, and if so, also determines a shape of the at least one cut.

6. The method according to claim 1, wherein the calculation of the at least one membrane is computed by detecting tunnels loops in the digital surface description (D).

7. The method according to claim 1, wherein the calculation of the at least one membrane is computed by detecting discontinuities in a direction of the shortest paths throughout the volume around the digital surface description (D).

8. The method according to claim 1, further comprising steps of:
 e) filling the flexible mold with a flexible casting material, and curing the object within the flexible mold; and
 f) non-destructive removal of the cured object from the flexible mold.

9. The method according to claim 8, wherein the flexible mold is produced by 3D-printing.

10. The method according to claim 8, wherein the flexible mold is produced by casting the flexible curable material into a corresponding metamold.

11. A re-usable flexible mold designed by the method of claim 1.

12. An object reproduced by the method according to claim 10.

13. The method according to claim 1 further comprising filling the flexible mold is finable with a resin casting material.

14. The method according to claim 1 wherein step c_2) includes calculating a process for 3D printing the flexible mold.

15. The method according to claim 5, wherein the calculation of the at least one cut is computed by detecting tunnels loops in the digital surface description (D).

16. The method according to claim 5, wherein the calculation of the at least one cut is computed by detecting discontinuities in a direction of the shortest paths throughout the volume around the digital surface description (D).

17. A method of reproducing an object, said method comprising:
 designing at least one re-usable two-pieced flexible mold for the reproduction of the object, wherein designing comprises the following steps:
 a) taking as an initial input (IN) a digital surface description (D) of the object to be reproduced, said input (IN) comprising a closed surface mesh (Mi) of the object to be reproduced, said initial closed surface mesh (Mi) being aligned with a surface of the object to be reproduced;
 b) calculating the flexible mold by executing the following steps:
  b1) separating the mesh into a number of connected surface patches (P1, P2), wherein each surface patch (P1, P2) is associated with a patch-individual parting direction and is selected based on an heuristic estimation of the effort for removal of each patch (P1, P2) from the flexible mold and wherein a design and number of patches (P1, P2) is selected based on a minimization algorithm; wherein the mesh comprises faces, wherein a visibility of a face is evaluated from a number of different viewpoints determined by potential parting directions, wherein neighbouring faces having at least one similar potential parting direction are grouped into a potential patch, splitting the mesh into a number of potential patches, and wherein an optimal set of patches is determined by the following criterions: {minimizing number of patches within a set, while ensuring that the entirety of the patches cover the entire mesh; minimizing the effort of removal of the patches (P1, P2) within a set};
  b2) calculating the flexible mold based on the surfaces patches (P1, P2) yielded in step b1), wherein the number of pieces of the flexible mold corresponds with the number of patches (P1, P2);
 c) calculating a process of production of the flexible mold, wherein the calculation comprises a selection of either:
  c_1) calculating a corresponding rigid metamold for casting the flexible mold yielded in step b); or
  c_2) calculating a process for additively manufacturing the flexible mold; and
 d) yielding a design of the flexible mold of step b) and a result of the calculation of the process of production according to step c) as an output (OUT);
 producing the two-pieced flexible mold utilizing the design yielded as the output (OUT) in step (d);
 filling a cavity defined by the two-pieced flexible mold with a flexible casting material; and
 forming the object from the flexible casting material within the filled cavity of the flexible mold.

18. The method according to claim 17, further comprising forming the flexible mold to include a sealing dam or a sealing lip for closing the flexible mold.

19. A method of reproducing an object, said method comprising:
 designing at least one re-usable two-pieced flexible mold for the reproduction of the object, wherein designing comprises the following steps:
 a) taking as an initial input (IN) a digital surface description (D) of the object to be reproduced, said input (IN) comprising a closed surface mesh (Mi) of the object to be reproduced, said initial closed surface mesh (Mi) being aligned with a surface of the object to be reproduced;
 b) calculating the flexible mold by executing the following steps:
  b1) separating the mesh into a number of connected surface patches (P1, P2), wherein each surface patch (P1, P2) is associated with a patch-individual parting direction and is selected either:
   b1_1) based on an heuristic estimation of the effort for removal of each patch (P1, P2) from the flexible mold and wherein a design and number of patches (P1, P2) is selected based on a minimization algorithm; or
   b1_2) based on a volume based calculation model, wherein a fictive volume enclosing the object to be reproduced is determined and wherein shortest paths from the surface of the mesh (Mi) to an outer boundary of the volume are determined for each point of the surface mesh (Mi), thus yielding potential extraction directions that are associated along the surface of the mesh (Mi), wherein the potential extraction directions are compared along the surface of mesh (Mi) and wherein the patches (P1, P2) are determined based on detected discontinuity of the potential extraction directions;
  b2) calculating the flexible mold based on the surfaces patches (P1, P2) yielded in step b1), wherein the number of pieces of the flexible mold corresponds with the number of patches (P1, P2);
 c) calculating a process of production of the flexible mold, wherein the calculation comprises a selection of either:
  c_1) calculating a corresponding rigid metamold for casting the flexible mold yielded in step b); or c_2) calculating a process for additively manufacturing the flexible mold; and d) yielding a design of the flexible mold of step b) and a result of the calculation of the process of production according to step c) as an output (OUT);

producing the two-pieced flexible mold utilizing the design yielded as the output (OUT) in step (d);

filling a cavity defined by the two-pieced flexible mold with a flexible casting material;

forming the object from the flexible casting material within the filled cavity of the flexible mold; and wherein the object or the corresponding cavity and the flexible mold is separated by at least one parting line (PL), wherein the at least one parting line (PL) is defined as at least one closed curve (C) in 3D space that is shaped when the two pieces of the flexible mold and the corresponding cavity or the object within the flexible mold meet one another, wherein the parting line (PL) is a curve that does not lie entirely within a single plane.

20. The method according to claim 19, further comprising forming the flexible mold to include a sealing dam or a sealing lip for closing the flexible mold.

* * * * *